(12) United States Patent
Cheng et al.

(10) Patent No.: US 8,582,288 B2
(45) Date of Patent: Nov. 12, 2013

(54) RETAINING MECHANISM AND AN ELECTRONIC DEVICE HAVING THE SAME

(75) Inventors: Wen-Chieh Cheng, New Taipei (TW); Yao-Ting Lee, New Taipei (TW); Li-Sheng Lin, New Taipei (TW)

(73) Assignee: Wistron Corporation, New Taipei (TW)

( * ) Notice: Subject to any disclaimer, the term of this patent is extended or adjusted under 35 U.S.C. 154(b) by 192 days.

(21) Appl. No.: 13/348,230

(22) Filed: Jan. 11, 2012

(65) Prior Publication Data
US 2012/0224348 A1  Sep. 6, 2012

(30) Foreign Application Priority Data
Mar. 1, 2011  (TW) .............................. 100106645 A (51) Int. Cl.
*H05K 5/00*  (2006.01)

(52) U.S. Cl.
USPC .............. 361/679.38; 174/138 E; 174/138 G; 361/679.33; 361/679.35; 361/726; 361/727; 361/732

(58) Field of Classification Search
USPC ......... 361/726, 727, 732, 740, 741, 742, 747, 361/752, 756, 759, 787, 796–802, 807, 808, 361/809, 810, 825, 679.31–679.39, 725; 174/138 E, 138 G, 561, 563
See application file for complete search history.

(56) References Cited

U.S. PATENT DOCUMENTS

| | | | |
|---|---|---|---|
| 7,715,184 B2 * | 5/2010 | Yang | 361/679.37 |
| 7,929,289 B2 * | 4/2011 | Tseng | 361/679.39 |
| 8,498,107 B2 * | 7/2013 | Liu | 361/679.37 |
| 2006/0245160 A1 * | 11/2006 | Zhang et al. | 361/685 |

* cited by examiner

*Primary Examiner* — Hoa C Nguyen
*Assistant Examiner* — Christopher L Augustin
(74) *Attorney, Agent, or Firm* — Whyte Hirschboeck Dudek S.C.

(57) ABSTRACT

A retaining mechanism, used for retaining an electronic component including a support bracket having an end part formed with an engaging hole, includes a mounting block having a mounting hole for receiving the end part of the support bracket, and a through hole communicating with the mounting hole. A seat body covers the mounting block, and has a bolt hole communicating with and disposed above the through hole, and a limiting slot communicating with one side of the bolt hole. A locking bolt includes a shank disposed slidably in the bolt hole, and a stopper block connected transversely to the bottom portion and slidable upward and downward along the limiting slot. The shank has a bottom portion adapted to engage releasably the engaging hole when the through hole is aligned with the engaging hole.

19 Claims, 13 Drawing Sheets

RETAINING MECHANISM AND AN ELECTRONIC DEVICE HAVING THE SAME

CROSS-REFERENCE TO RELATED APPLICATION

This application claims priority of Taiwanese Application No. 100106645, filed on Mar. 1, 2011.

BACKGROUND OF THE INVENTION

1. Field of the Invention

This invention relates to a retaining mechanism, and more particularly to a retaining mechanism for retaining an electronic component, such as an optical disk drive or a floppy disk drive, in a casing, and an electronic device having the retaining mechanism.

2. Description of the Related Art

Currently, an optical disk drive is usually fixed to a notebook computer through a plurality of screws. However, use of the screws as a fastening method not only can increase assembly or disassembly time, but also can increase the production costs. Hence, an area of improvement that the present invention focuses on is that related to a retaining mechanism that does not need screws.

SUMMARY OF THE INVENTION

An object of the present invention is to provide a retaining mechanism having a simple structure that can facilitate quick and easy locking or removal of an electronic component to or from a casing, and that can reduce assembly or disassembly time and the production costs associated therewith.

Another object of the present invention is to provide an electronic device having a retaining mechanism. The retaining mechanism has a simple structure that can facilitate quick and easy locking or removal of an electronic component to or from a casing, and that can reduce assembly or disassembly time and the production costs associated therewith.

The purpose of the present invention and the solution to the conventional technical problems are achieved through employment of the below technical means. According to one aspect of disclosure of the present invention, a retaining mechanism is used for retaining an electronic component in a casing. The electronic component includes a support bracket having an end part formed with an engaging hole. The casing includes a bottom wall, and two spaced-apart guide elements projecting from the bottom wall to define therebetween a receiving space for receiving the electronic component. The retaining mechanism comprises a mounting block, a seat body, and a locking bolt. The mounting block is adapted to project from an inner surface of the bottom wall, and has a mounting hole for receiving the end part of the support bracket when the electronic component is guided by the guide elements to move into the receiving space, and a through hole that communicates with the mounting hole and that is adapted to align with the engaging hole. The seat body is seated on and covers the mounting block, and has a bolt hole communicating with and disposed above the through hole, and a limiting slot communicating with one side of the bolt hole. The locking bolt includes a shank disposed slidably in the bolt hole and having a top portion extending through a top surface of the seat body, and a bottom portion extending into the through hole. The locking bolt further includes a stopper block connected transversely to the bottom portion and abutting against the mounting block. The stopper block is extendable into the limiting slot, and is slidable upward and downward along the limiting slot. The bottom portion of the shank is adapted to engage releasably the engaging hole when the through hole is aligned with the engaging hole.

The purpose of the present invention and the solution to the conventional technical problems may also be achieved through employment of the below technical means.

The mounting block includes a top plate having the through hole and spaced apart from the bottom wall. The stopper block abuts against the top plate. The mounting hole is disposed below the top plate, and has a side opening adapted to communicate with the receiving space for entry of the end part of the support bracket into the mounting hole. The bottom portion of the shank is adapted to be exposed on a bottom opening of the bottom wall when the end part of the support bracket enters the mounting hole and the bottom portion of the shank engages the engaging hole.

The bottom portion of the shank has a shank slanting face facing the side opening. The shank slanting face is adapted to be pushed upward by a plate slanting face of the end part of the support bracket when the end part of the support bracket enters the mounting hole through the side opening. The top plate is formed with a recess communicating with the through hole and receiving the stopper block.

The recess has a polygonal shape, and the stopper block has a shape corresponding to that of the recess.

The retaining mechanism further comprises a biasing spring sleeved on the shank and having two opposite ends abutting respectively against the stopper block and the seat body. The biasing spring biases the stopper block to move toward the recess.

The seat body has two limiting slots disposed on and communicating respectively with two opposite sides of the bolt hole. The top plate is formed with two recesses communicating respectively with two opposite sides of the through hole. The locking bolt includes two stopper blocks respectively received in the recesses. Each stopper block extends into a respective limiting slot. The two ends of the biasing spring abut respectively against the stopper blocks and the seat body.

The recess has a sector-shaped. The seat body abuts against the top plate. The limiting slot communicates with a portion of the recess. The locking bolt is rotatable about an axis of the shank to move the stopper block between a first position, where the stopper block is aligned with the limiting slot, and a second position, where the stopper block is out of alignment with the limiting slot and abuts against the seat body.

The sector-shaped recess is bounded by first and second stop edges that are angularly spaced apart from each other. The stopper block contacts the first stop edge when in the first position, and contacts the second stop edge when in the second position.

The top plate is further formed with a positioning groove communicating with the recess. The stopper block is provided with a projection to engage releasably the positioning groove. The projection engages the positioning groove when the stopper block is in the second position.

According to another aspect of disclosure of this invention, an electronic device comprises an electronic component, a casing, and a retaining mechanism. The electronic component includes a support bracket having an end part formed with an engaging hole. The casing includes a bottom wall, and two spaced-apart guide elements projecting from the bottom wall to define therebetween a receiving space above the bottom wall. The receiving space receives the electronic component. The guide elements are capable of guiding the electronic component to move into or out of the receiving space. The retaining mechanism includes a mounting block, a seat body, and a locking bolt. The mounting block projects from an inner surface of the bottom wall, and has a mounting hole to receive the end part of the support bracket when the electronic component is moved into the receiving space, and a through hole that communicates with the mounting hole and that is alignable with the engaging hole. The seat body is seated on and covers the mounting block, and has a bolt hole communicating with and disposed above the through hole, and a limiting slot communicating with one side of the bolt hole. The locking bolt includes a shank disposed slidably in the bolt hole and having a top portion extending through a top surface of the seat body, and a bottom portion extending into the through hole. The locking bolt further includes a stopper block connected transversely to the bottom portion and abutting against the mounting block. The stopper block is extendable into the limiting slot, and is slidable upward and downward along the limiting slot. The bottom portion of the shank is engaged releasably with the engaging hole when the through hole is aligned with the engaging hole.

The bottom portion of the shank has a shank slanting face facing the side opening. The end part of the support bracket has a plate slanting face to push upward the shank slanting face when the end part of the support bracket enters the mounting hole through the side opening. The top plate is formed with a recess communicating with the through hole and receiving the stopper block.

The support bracket further has a tool-receiving groove communicating with the engaging hole and opposite to the plate slanting face.

Through the aforesaid technical means, the advantages of the electronic device having the retaining mechanism according to the present invention reside in the fact that through the configuration of the retaining mechanism, the electronic component can be quickly and easily locked to or removed from the casing, so that assembly and disassembly time can be reduced, and the production costs associated therewith can be minimized.

BRIEF DESCRIPTION OF THE DRAWINGS

Other features and advantages of the present invention will become apparent in the following detailed description of the embodiments of the invention, with reference to the accompanying drawings, in which.

DETAILED DESCRIPTION OF THE PREFERRED EMBODIMENTS

The above-mentioned and other technical contents, features, and effects of this invention will be clearly presented from the following detailed description of the two embodiments in coordination with the reference drawings. Through description of the concrete implementation method, the technical means employed and the effectiveness to achieve the predetermined purposes of the present invention will be thoroughly and concretely understood. However, the enclosed drawings are used for reference and description only, and are not used for limiting the present invention.

Before this invention is described in detail, it should be noted that, in the following description, similar elements are designated by the same reference numerals.

Figure 1:
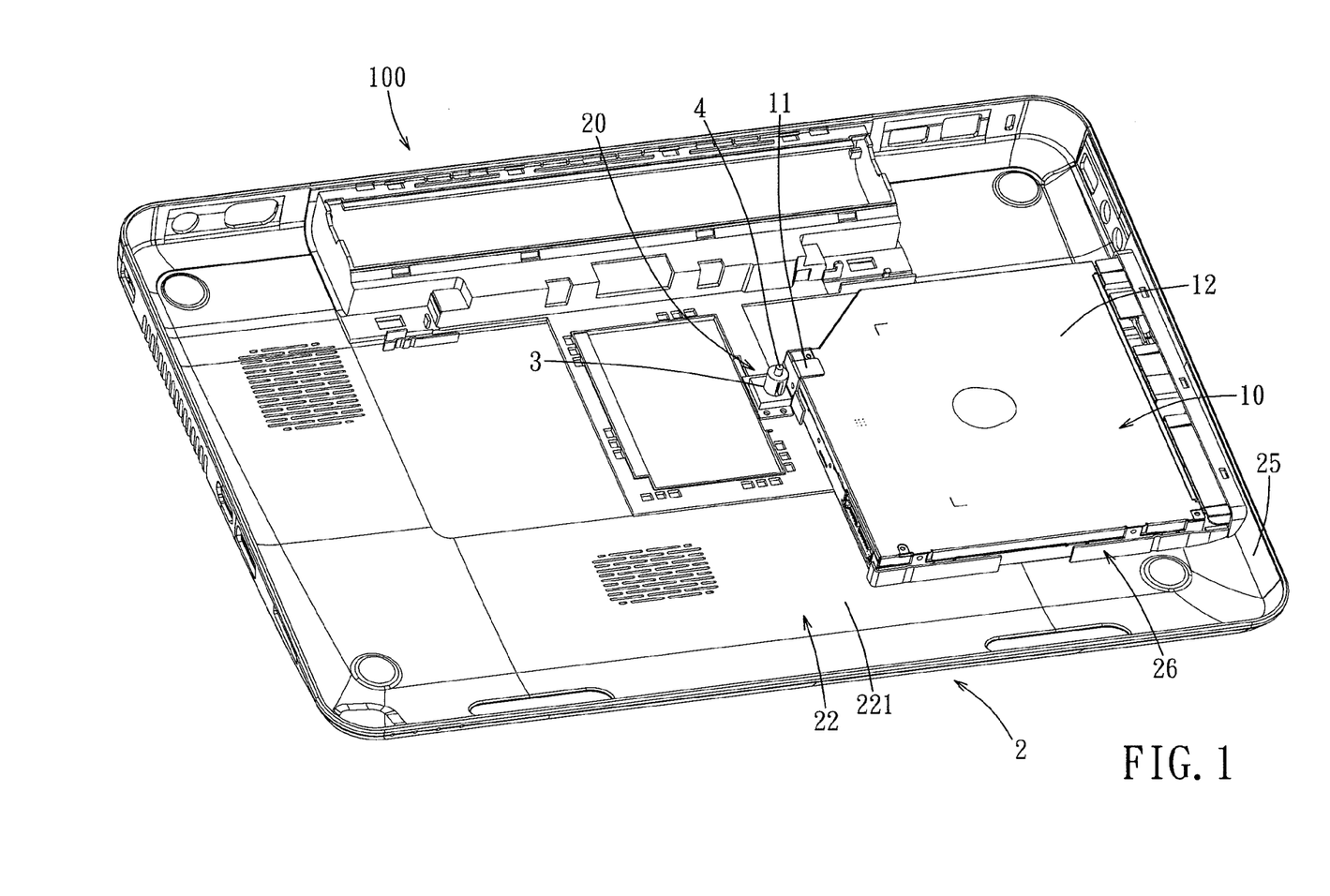
FIG. 1 is a perspective view of an electronic device having a retaining mechanism according to the first embodiment of the present invention.

Referring to FIGS. 1 to 10, an electronic device 100 according to the first embodiment of the present invention comprises an electronic component 10 and a retaining mechanism 20. In this embodiment, the electronic device 100 is exemplified as a notebook computer. The electronic component 10 is exemplified as an optical disk drive. FIG. 1 illustrates a portion of the electronic device 100. The electronic device 100 may also be a tablet computer, while the electronic component 10 may be a hard disk.

Figure 2:
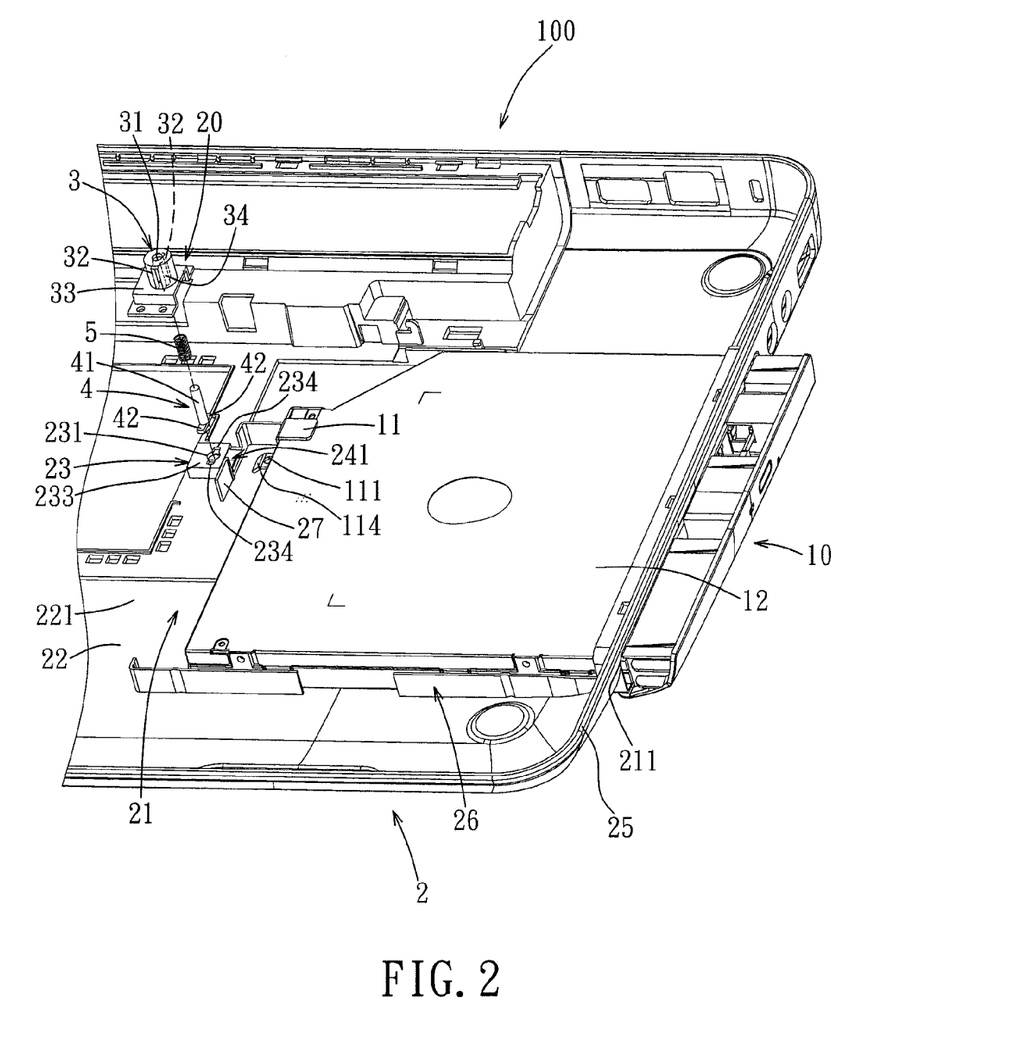
FIG. 2 is a fragmentary perspective view of the first embodiment.
Figure 3:
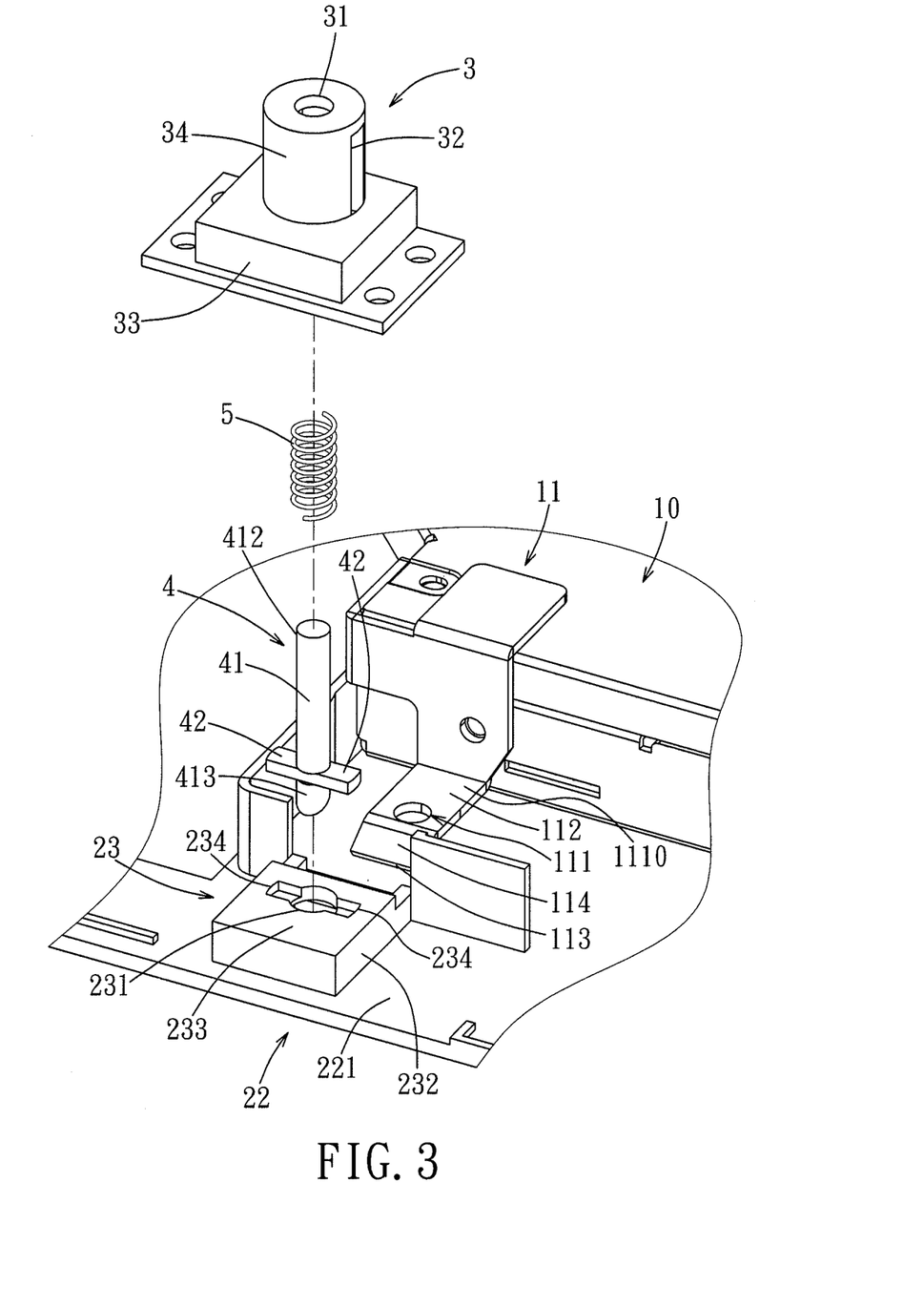
FIG. 3 is an enlarged exploded perspective view of the retaining mechanism of the first embodiment.
Figure 4:
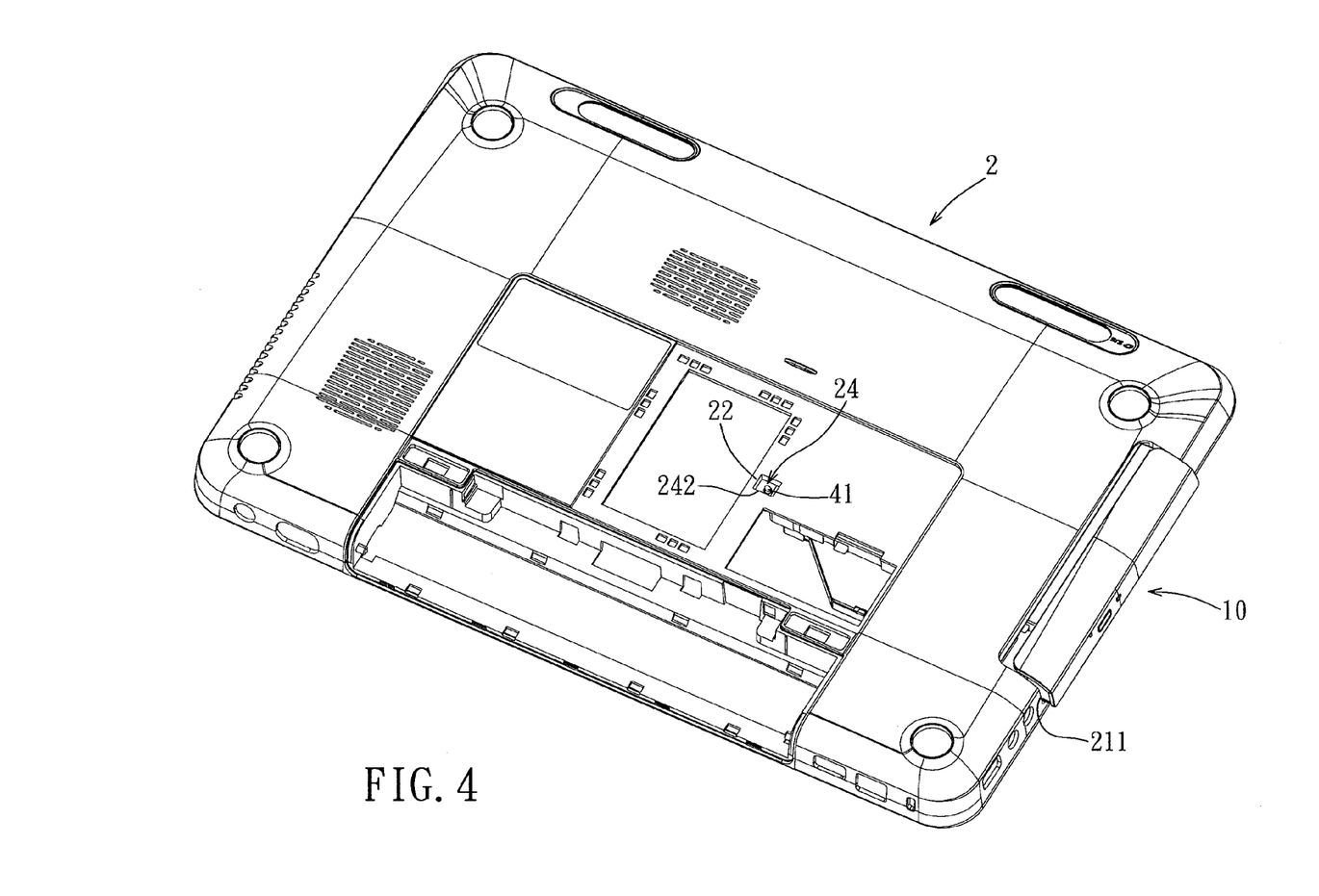
FIG. 4 is a perspective bottom view of a casing of the first embodiment.
Figure 5:
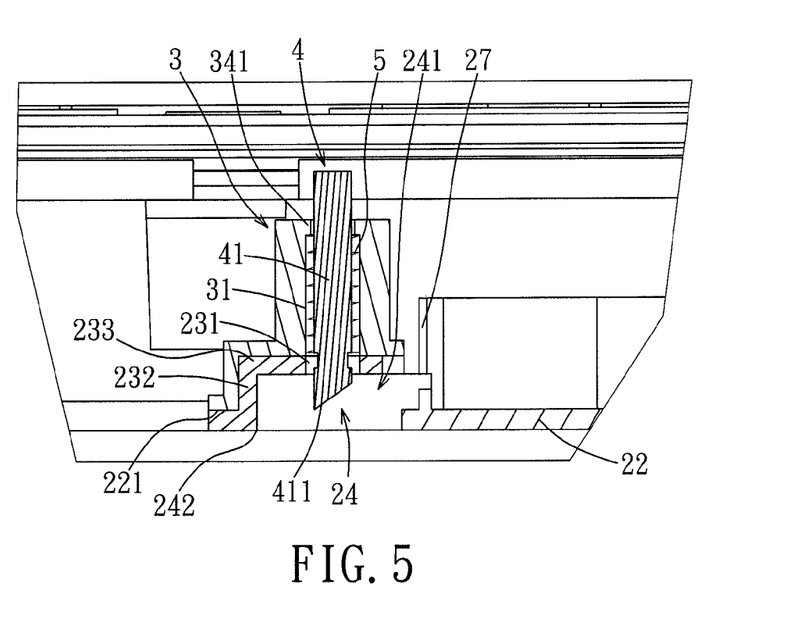
FIG. 5 is a sectional view of the retaining mechanism of the first embodiment in an assembled state.

With reference to FIGS. 2 to 4, the electronic device 100 has a casing 2 including a bottom wall 22, a surrounding wall 25 extending upward from an outer peripheral edge of the bottom wall 22, and two spaced-apart guide elements 26 (only one is visible in FIGS. 1 and 2) projecting from an inner surface 221 of the bottom wall 22 to define therebetween a receiving space 21 above the bottom wall 22. The receiving space 21 has an opening 211 formed in the surrounding wall 25. The bottom wall 22 has a bottom opening 242 (see FIGS. 4 and 8) proximate to the receiving space 21.

The electronic component 10 is disposed removably and slidably in the receiving space 21, and includes a main body 12, and a support bracket 11 fixed to an inner end of the main body 12 through a screw-fastening method. The guide elements 26 are abuttable respectively against two opposite lateral sides of the main body 12 when the electronic component 10 moves into the receiving space 21 to restrict sliding movement of the electronic component 10. Further, through the guide elements 26, the electronic component 10 can be guided to slide quickly and easily into or out of the receiving space 21 via the opening 211. The support bracket 11 has an end part 110 formed with an engaging hole 111, and a tool-receiving groove 115 communicating with the engaging hole 111. The end part 110 includes a first plate section 112 extending in a direction parallel to the bottom wall 22 and having the engaging hole 111 and the tool-receiving groove 115.

The retaining mechanism 20 includes a mounting block 23, a seat body 3, and a locking bolt 4. The mounting block 23 projects from the inner surface 221 of the bottom wall 22 in proximity to the receiving space 21, and has a mounting hole 24, and a through hole 231 that communicates with the mounting hole 24 and that is alignable with the engaging hole 111. The mounting hole 24 receives the end part 110 of the support bracket 11 when the electronic component 10 moves into the receiving space 21. The mounting block 23 includes a peripheral wall 232 extending upward from the inner surface 221 of the bottom wall 22, and a top plate 233 connected to a top end of the peripheral wall 232 and spaced apart from the bottom wall 22. The top plate 233 and the peripheral wall 232 cooperatively confine the mounting hole 24. The top plate 233 has the through hole 231, and is formed with at least one recess 234 communicating with the through hole 231. The mounting hole 24 has a side opening 241 communicating with the receiving space 21. The bottom opening 242 communicates the mounting hole 24 with an external portion of the casing 2.

The seat body 3 is seated on and covers the mounting block 23, and is formed with a bolt hole 31 communicating with and disposed above the through hole 231, and at least one limiting slot 32 communicating with one side of the bolt hole 31. The seat body 3 includes a cover member 33 covering the mounting block 23 and abutting against the top plate 233, and a tubular member 34 extending upward from a top side of the cover member 33. The cover member 33 can be fixed to the bottom wall 22 through any suitable method, such as a thermal welding method, a hook-engaging method, or a screw-fastening method. The bolt hole 31 extends from a top surface of the tubular member 34 to a bottom end of the cover member 33. The limiting slot 32 extends from one side of the tubular member 34 through the bottom end of the cover member 33, and corresponds in position to the recess 234.

The locking bolt 4 includes a shank 41 and at least one stopper block 42. The shank 41 is disposed slidably in the bolt hole 31, and has a top portion 412 extending through the top surface of the tubular member 34, and a bottom portion 413 extending into the mounting hole 24 via the through hole 231. The stopper block 42 is connected transversely to the bottom portion 413 of the shank 41, and abuts against the mounting block 23. The stopper block 42 is extendable into the limiting slots 32, and is slidable upward and downward along the limiting slot 32. Through the abutment of the stopper block 42 against the top plate 233, the bottom portion 413 of the shank 41 can be retained within the mounting hole 24 and will not slide out of the casing 2 via the through hole 231. The bottom portion 413 of the shank 41 engages releasably the engaging hole 111 when the through hole 231 aligns with the engaging hole 111. Through this configuration, the locking bolt 4 can lock the electronic component 10 to the mounting block 23.

It should be noted that through the presence of the side opening 241, when the electronic component 10 is inserted into the receiving space 21 via the opening 211, the end part 110 of the support bracket 11 can extend into the mounting hole 24 via the side opening 241, so that the engaging hole 111 in the first plate section 112 is alignable with the through hole 231 for extension of the bottom portion 413 of the shank 41 therethrough. Further, through the presence of the bottom opening 242, the end part 110 of the support bracket 11 and the bottom portion 413 of the shank 41 can be exposed when the end part 110 enters the mounting hole 24 and the bottom portion 413 of the shank 41 engages the engaging hole 111, so that a user can access into the mounting hole 24 via the bottom opening 242 to disengage the bottom portion 413 of the shank 41 from the engaging hole 111, thereby unlocking the electronic component 10 from the casing 2.

Figure 6:
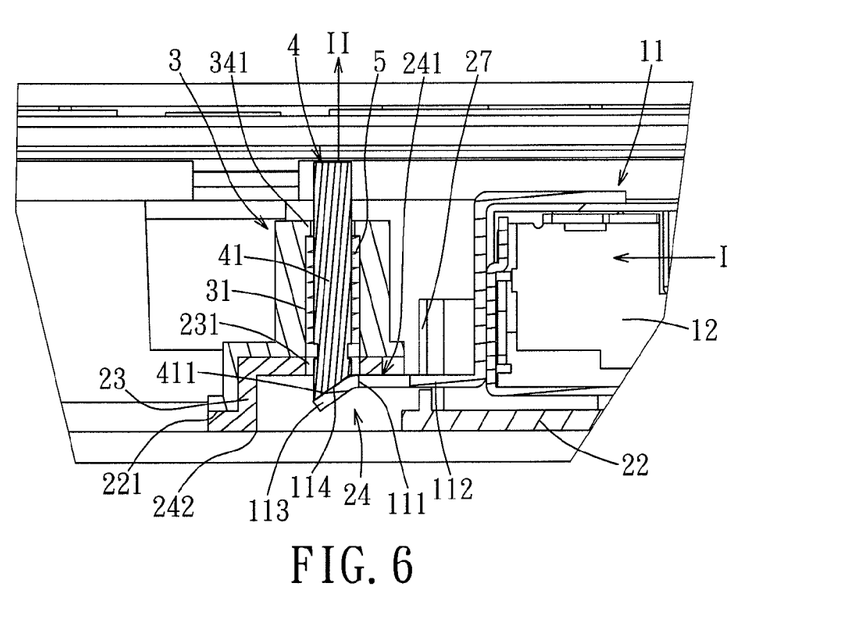
FIG. 6 is a view similar to FIG. 5, but illustrating an end part of a support bracket entering a mounting hole and abutting against a bottom portion of a shank of the retaining mechanism.

To permit the support bracket 11 to push the shank 41 upwardly when the end part 110 thereof extends into the mounting hole 24, in this embodiment, the bottom portion 413 of the shank 41 has a bottom end formed with a shank slanting face 411 facing the side opening 241, and the end part 110 further includes a second plate section 113 connected to and slanting downward from an inner end of the first plate section 112 and having a plate slanting face 114 to contact the shank slanting face 411. The plate slanting face 114 is opposite to the tool-receiving groove 115. As shown in FIG. 6, when the end part 110 enters the mounting hole 24 via the side opening 241, the plate slanting face 114 contacts the shank slanting face 411, and applies an upward force on the shank slanting face 411 to push the shank 41 upwardly. As the support bracket 11 moves further into the mounting hole 24 until the engaging hole 111 aligns with the through hole 231, the locking bolt 4 falls down due to its own weight and by gravity so that the bottom portion 413 of the shank 41 engages with the engaging hole 111. Further, in this embodiment, the recess 234 has a polygonal shape, and the stopper block 42 has a shape corresponding to that of the recess 234. Through this configuration, when the locking bolt 4 is mounted on the top plate 233 of the mounting block 23, the locking bolt 4 will not rotate relative to the top plate 233, and the shank slanting face 411 can be positioned facing the side opening 241.

Moreover, the limiting slot 32 has a shape corresponding to that of the stopper block 42, and defines a sliding path for the stopper block 42. Through this configuration, the shank 41 of the locking bolt 4 can be limited to slide upward and downward along the bolt hole 31, and will not rotate relative to the seat body 3. The locking bolt 4 can thus be prevented from moving out of the mounting block 23.

To retain the bottom portion 413 of the shank 41 within the mounting hole 24, the retaining mechanism 20 further includes a biasing spring 5 sleeved on the shank 41 to bias the shank 41 to move toward the mounting hole 24. The biasing spring 5 is configured as a compression spring having two opposite ends abutting respectively against the stopper block 42 and a top wall 341 of the tubular member 34. The biasing spring 5 also biases the stopper block 42 to move toward the recess 234. Through this configuration, the stopper block 42 can be retained within the recess 234, and the bottom portion 413 of the shank 41 can be retained within the mounting hole 24. Further, the shank 41 will not slide out of the mounting hole 24 when the casing 2 is turned upside down.

Preferably, in this embodiment, the seat body 3 is formed with two limiting slots 32 disposed on and communicating respectively with two opposite sides of the bolt hole 31. The top plate 233 is formed with two recesses 234 communicating respectively with two opposite sides of the through hole 231. The locking bolt 4 includes two stopper blocks 42 respectively received in the recesses 234. Each stopper block 42 extends into a respective limiting slot 32. The biasing spring 5 has one end abutting against the two stopper blocks 42, and the other opposite end abutting against the top wall 341 of the tubular member 34. Through this configuration, the biasing spring 5 can bias uniformly the stopper blocks 42 toward the respective recesses 234, and the bottom portion 413 of the shank 41 can be retained within the mounting hole 24.

Figure 7:
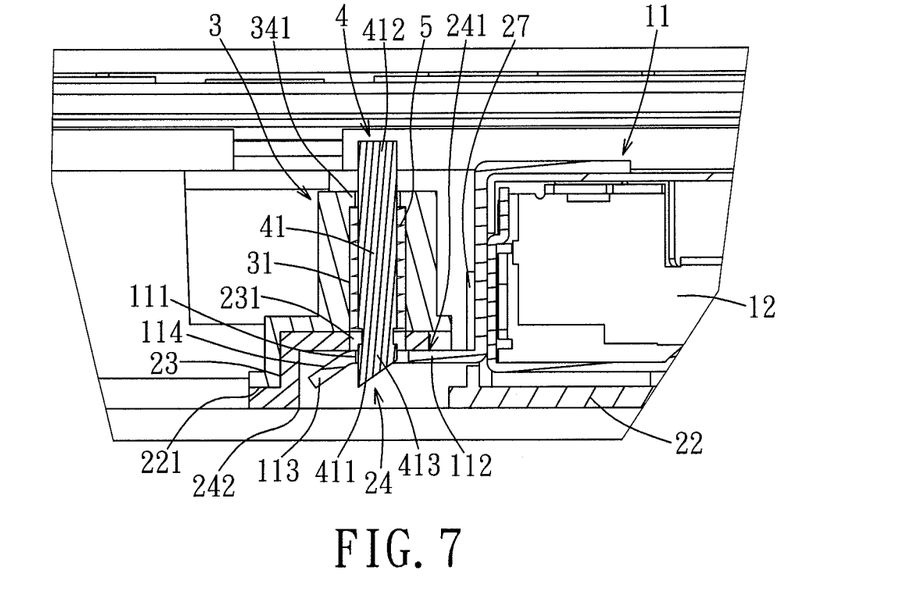
FIG. 7 is a view similar to FIG. 6, but illustrating a locking bolt of the retaining mechanism engaging an engaging hole in the end part of the support bracket.

With reference to FIGS. 2, 6, and 7, to lock the electronic component 10 in the casing 2, the electronic component 10 is first inserted into the receiving space 21 via the opening 211 in the direction of an arrow (I), and the first and second plate sections 112, 113 of the end part 110 of the support bracket 11 extend into the mounting hole 24 via the side opening 241. When the plate slanting face 114 abuts against the shank slanting face 411, the plate slanting face 114 applies an upward force to the shank slanting face 411 to gradually move the shank 41 upward in the direction of an arrow (II). The stopper blocks 42 compress the biasing spring 5 at this time. As the electronic component 10 continues to move inside the receiving space 21 until the inner end of the main body 12 abuts against a stop wall 27 which projects from the inner surface 221 of the bottom wall 22, the electronic component 10 is stopped from moving further, and the engaging hole 111 in the support bracket 11 is aligned with the through hole 231 in the mounting block 23 at the same time. Through a return force of the biasing spring 5 that returns the locking bolt 4 to its original position, the shank 41 is biased to move downward, and the bottom portion 413 of the shank 41 is engaged to the engaging hole 111, thereby locking the electronic component 10 to the casing 2.

Figure 8:
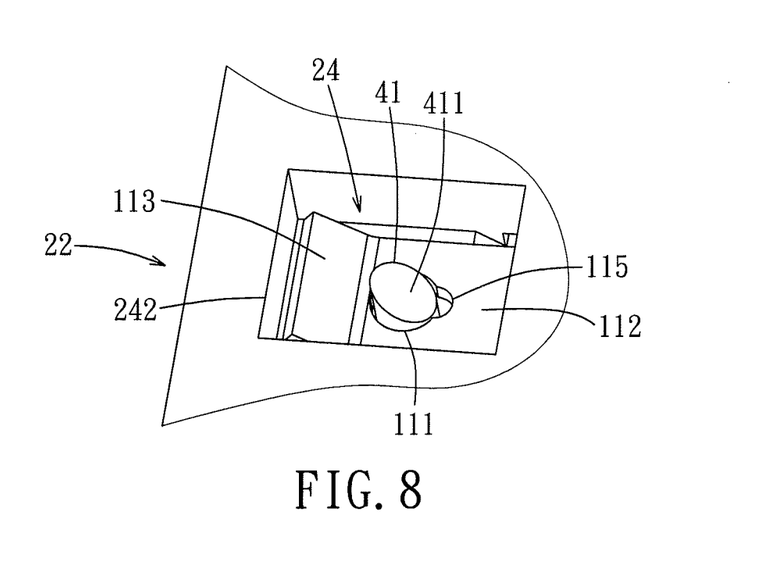
FIG. 8 is a fragmentary enlarged perspective view of a bottom wall of the casing.
Figure 9:
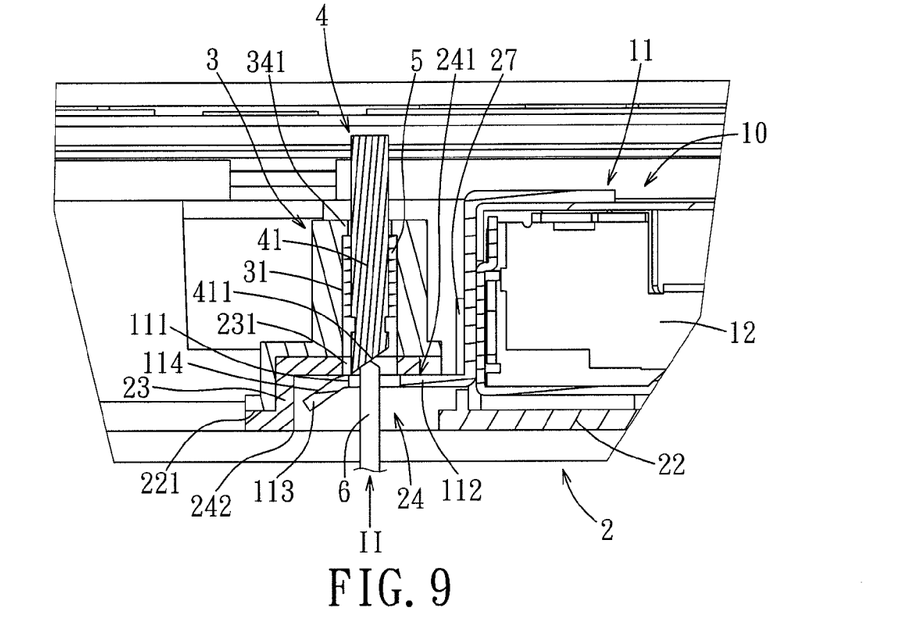
FIG. 9 is a view similar to FIG. 7, but illustrating the locking bolt being pushed upward by an auxiliary tool.
Figure 10:
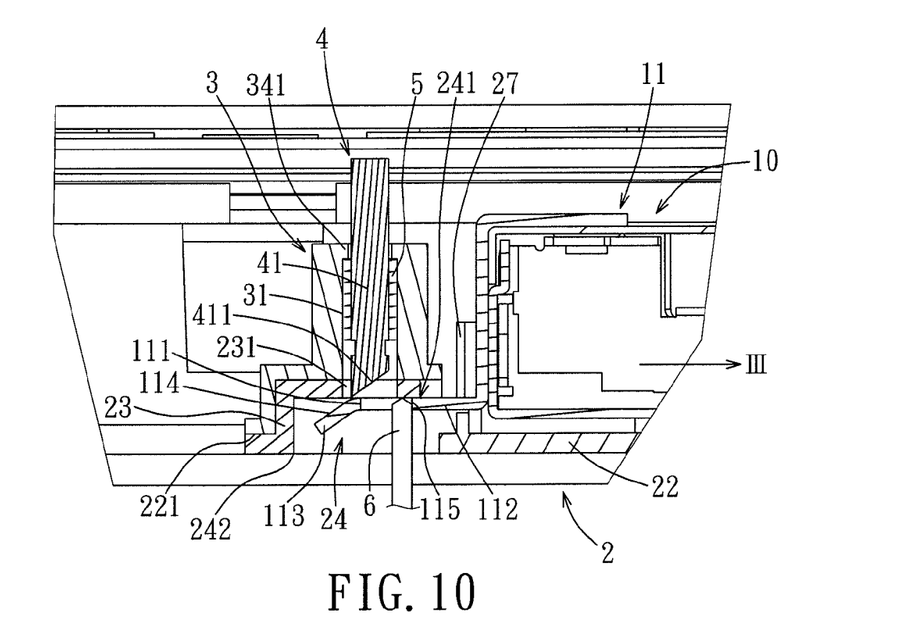
FIG. 10 is a view similar to FIG. 9, but illustrating the auxiliary tool being received in a tool-receiving groove in the end part of the support bracket.

With reference to FIGS. 8 and 9, to remove the electronic component 10 from the casing 2 for repair or replacement, the user uses an auxiliary tool 6 (for example, a screwdriver) to extend into the mounting hole 24 via the bottom opening 242 and push the bottom portion 413 of the shank 41 upward in the direction of the arrow (II) so as to move the bottom portion 413 of the shank 41 away from and out of engagement with the engaging hole 111, thereby placing the shank 41 and the support bracket 11 in an unlock state. Afterwards, with reference to FIGS. 8 and 10, because the first plate section 112 has the tool-retaining groove 115 communicating with the engaging hole 111 and disposed opposite to the plate slanting face 114, and because the shank 41 and the support bracket 11 are in the unlock state, the user can move the auxiliary tool 6 in the direction of an arrow (III) to move the tool 6 into the tool-retaining groove 115, and apply a force on the auxiliary tool 6 so that the auxiliary tool 6 can push the support bracket 11 to move out of the mounting hole 24. At this time, a portion of the electronic component 10 protrudes out of the opening 211, and the user can easily pull the electronic component 10 out of the receiving space 21 and away from the casing 2.

Referring to FIGS. 11 to 18, an electronic device 100' according to the second embodiment of the present invention is shown to be similar to the first embodiment. The difference between the first and second embodiments resides in the construction of the retaining mechanism 20'.

Figure 12:
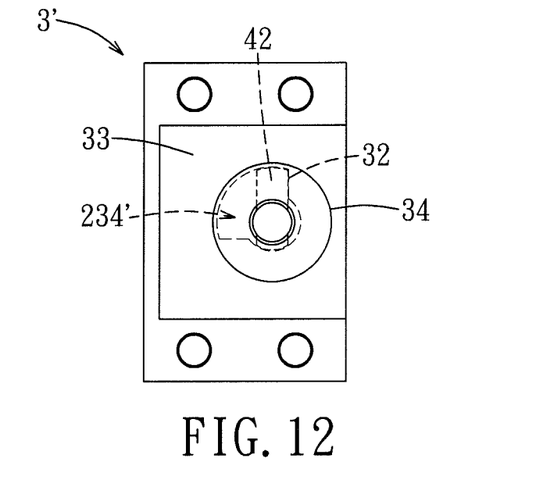
FIG. 12 is an enlarged schematic top view of the retaining mechanism of the second embodiment.
Figure 18:
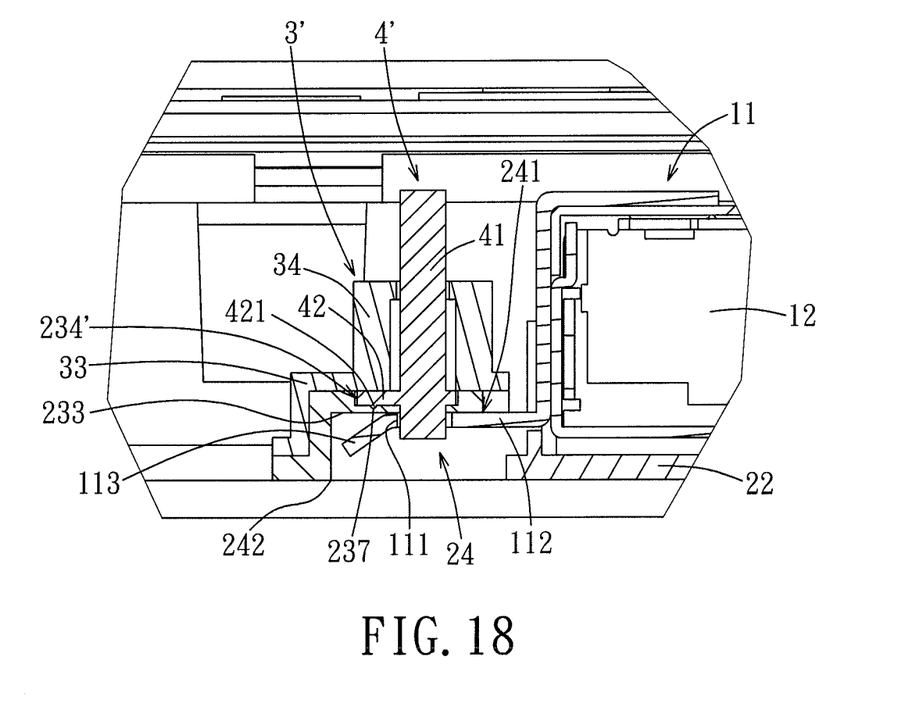
FIG. 18 is a view similar to FIG. 16, but illustrating the stopper block abutting against a seat body of the retaining mechanism.

In this embodiment, the top plate 233 of the mounting block 23 has only one recess 234' with a sector-shaped, the seat body 3' has only one limiting slot 32 communicating with a portion of the sector-shaped recess 234', and the locking bolt 4' has only one stopper block 42. The locking bolt 4 is rotatable about an axis of the shank 41 to move the stopper block 42 between a first position and a second position. In the first position, as shown in FIG. 12, the stopper block 42 is aligned with the limiting slot 32. At this time, when the shank 41 is pushed upward, the stopper block 42 can slide upward along the limiting slot 32. Because the stopper block 42 is restricted within the limiting slot 32, the shank 41 will not rotate during its upward movement. In the second position, as shown in FIG. 18, the stopper block 42 is out of alignment with the limiting slot 32, and abuts against a bottom surface of the cover member 33. At this time, because the stopper block 42 is blocked by the cover member 33, the shank 41 of the locking bolt 4 cannot slide upward relative to the seat body 3' when pushed.

Figure 13:
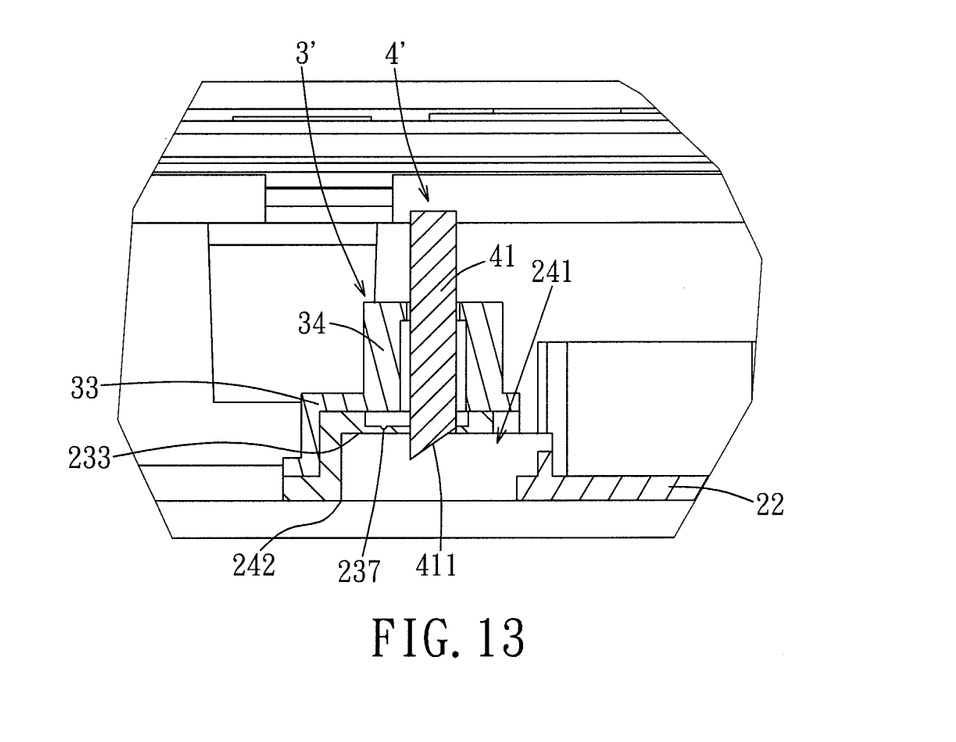
FIG. 13 is a fragmentary enlarged sectional view of the second embodiment.
Figure 14:
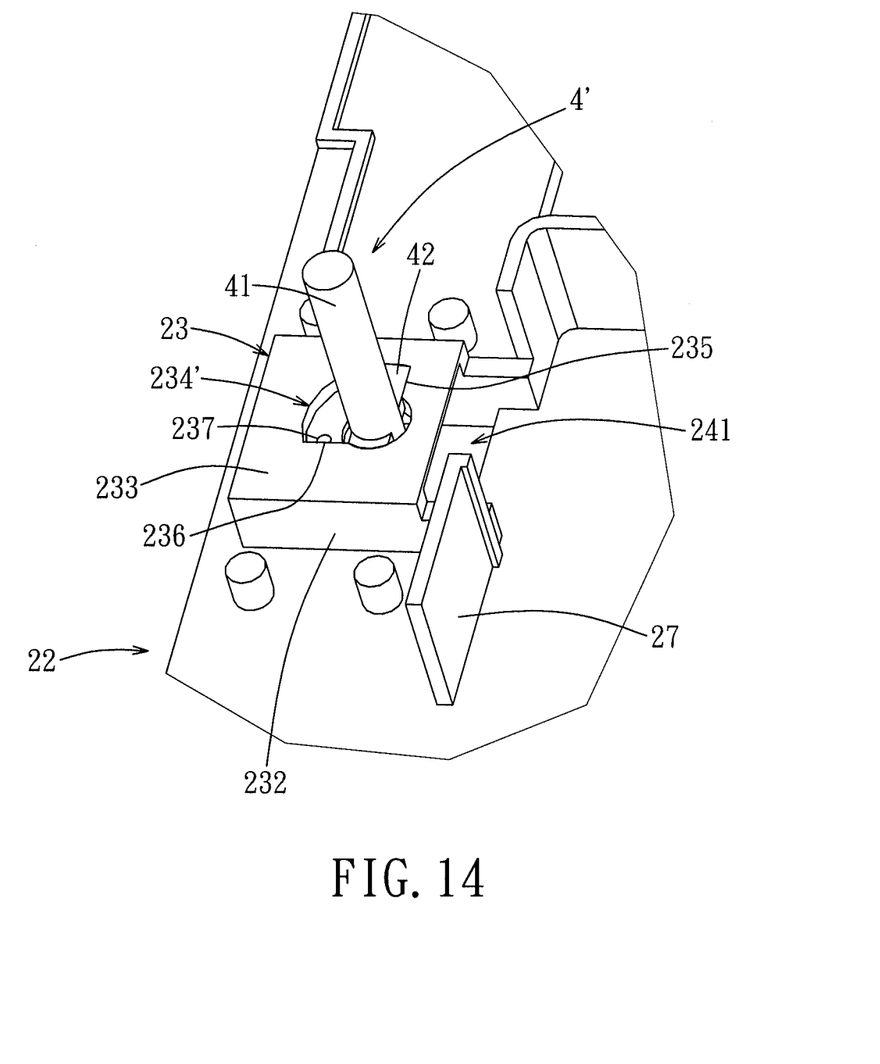
FIG. 14 is a fragmentary enlarged perspective view of the second embodiment.

With reference to FIGS. 12 to 14, the sector-shaped recess 234' of the mounting block 23 is bounded by first and second stop edges 235, 236 that are angularly spaced apart from each other. The stopper block 42 contacts the first stop edge 235 when in the first position, and contacts the second stop edge 236 when in the second position. Through this configuration, a rotational angle of the stopper block 42 can be limited.

Figure 11:
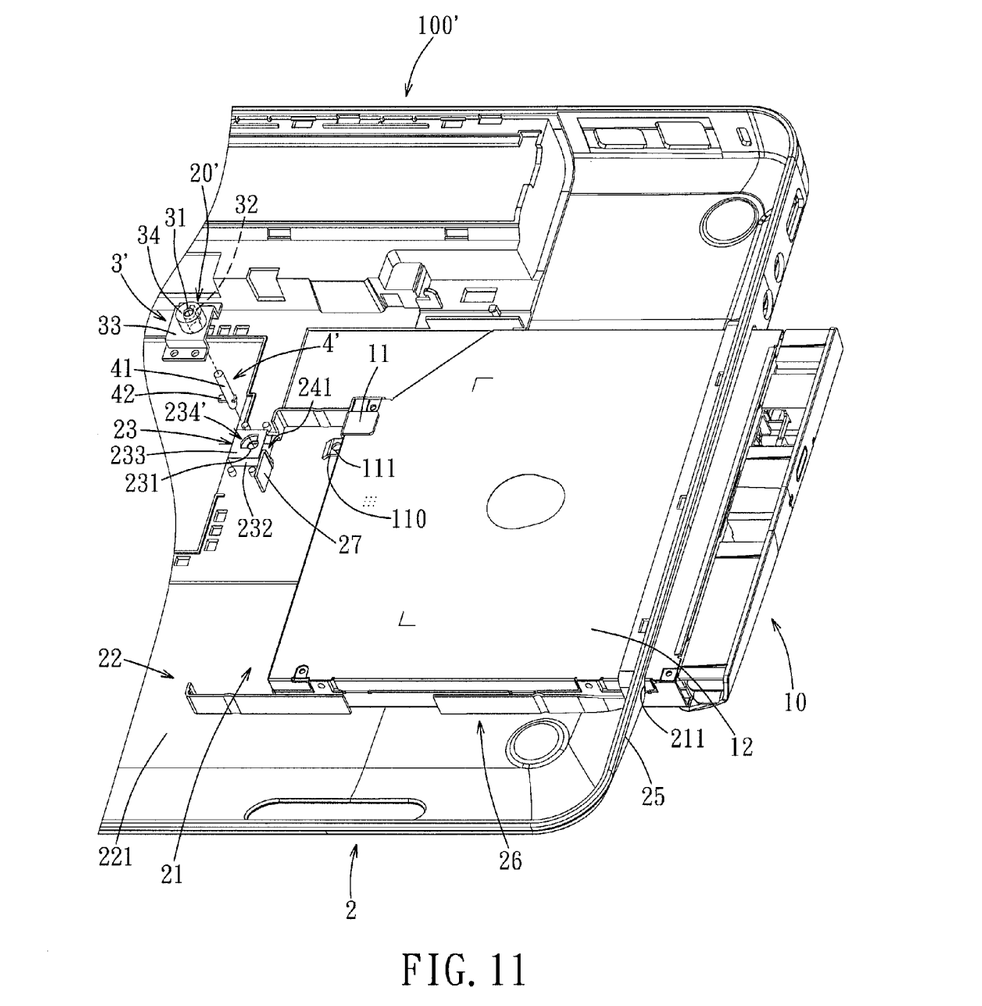
FIG. 11 is a fragmentary perspective view of an electronic device having a retaining mechanism according to the second embodiment of the present invention.
Figure 15:
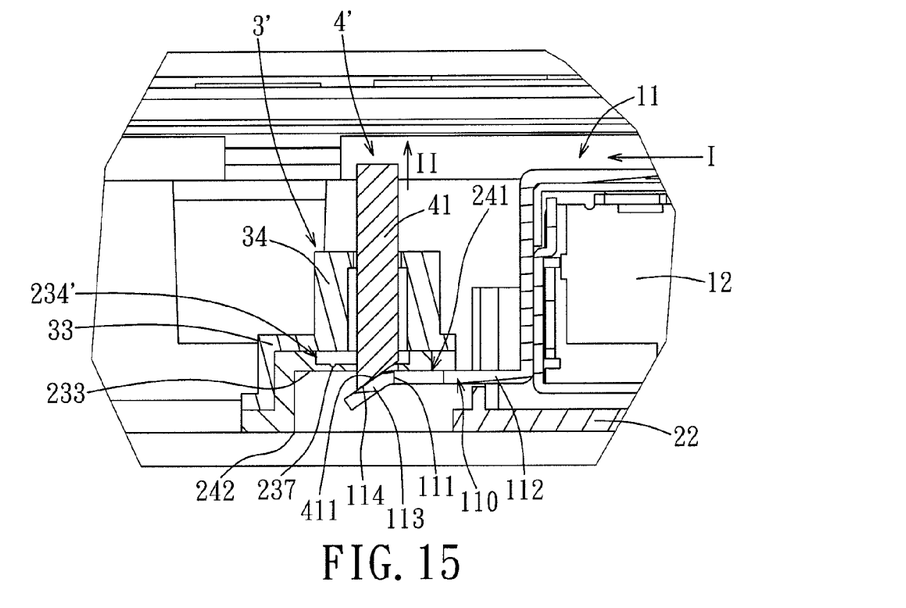
FIG. 15 is a view similar to FIG. 13, but illustrating an end part of a support bracket entering a mounting hole and abutting against a bottom portion of a shank of the retaining mechanism.
Figure 16:
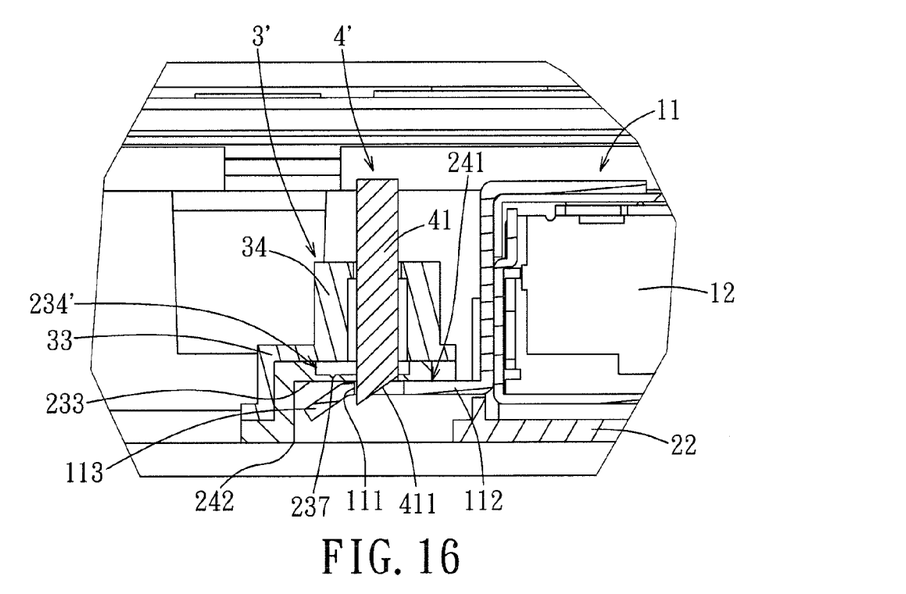
FIG. 16 is a view similar to FIG. 15, but illustrating a locking bolt of the retaining mechanism engaging an engaging hole in the end part of the support bracket.

With reference to FIGS. 11, 15, and 16, to lock the electronic component 10 in the casing 2, the electronic component 10 is first inserted into the receiving space 21 via the opening 211 in the direction of the arrow (I), and the first and second plate sections 112, 113 of the end part 110 of the support bracket 11 extend into the mounting hole 24 via the side opening 241. When the plate slanting face 114 abuts against the shank slanting face 411, the plate slanting face 114 applies an upward force to the shank slanting face 411 to gradually move the shank 41 upward in the direction of the arrow (II). When the inner end of the main body 12 of the electronic component 10 abuts against the stop wall 27, the electronic component 10 is stopped from moving further, and the engaging hole 111 in the support bracket 11 is aligned with the through hole 231 in the mounting block 23 at the same time. Because the biasing spring 5 shown in FIG. 2 is dispensed in this embodiment, the shank 41 can fall downward due to its own weight and by gravity so as to engage the bottom portion 413 thereof with the engaging hole 111, thereby locking the electronic component 10 to the casing 2.

Figure 17:
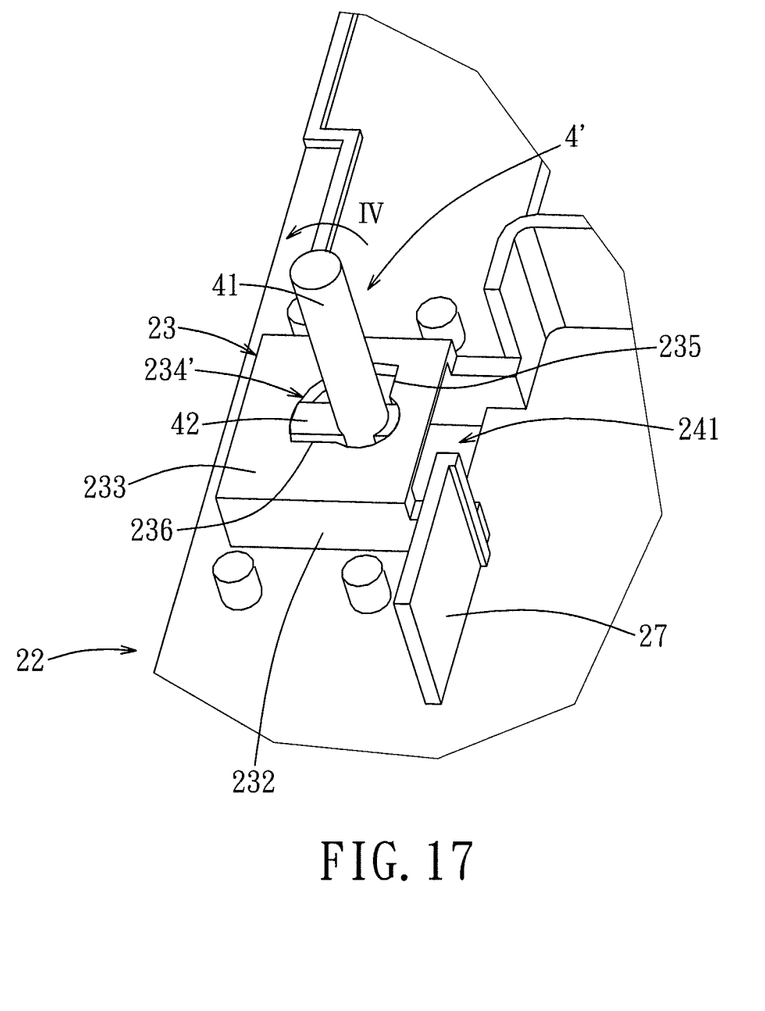
FIG. 17 is a view similar to FIG. 14, but illustrating a stopper block of the locking bolt being rotated to another position.

With reference to FIGS. 17 and 18, to prevent the shank 41 from sliding out of the engaging hole 111 when the casing 2 is turned upside down, the user can extend his/her fingers into the mounting hole 24 via the bottom opening 242 to grip the bottom portion 413 of the shank 41 and rotate the shank 41 in the direction of an arrow (IV). When the stopper block 42 abuts against the second stop edge 236 of the recess 234', rotation of the shank 41 is stopped, and the stopper block 42 is disposed at the second position. Because the top plate 233 is further formed with a positioning groove 237 communicating with the recess 234', and because a bottom end of the stopper block 42 is provided with a projection 421, when the stopper block 42 is disposed at the second position, the projection 421 engages releasably the positioning groove 237, so that the stopper block 42 can be stably positioned at the second position and can abut against the bottom surface of the cover member 33. Moreover, to remove the electronic component 10 from the casing 2 for repair or replacement, the user rotates the shank 41 in a direction opposite to the arrow (IV). When the projection 421 is disengaged from the positioning groove 237, the stopper block 42 can be rotated to the first position. At this time, the electronic component 10 can be removed from the casing 2 using the disassembling method described in the first embodiment.

From the aforesaid description, it is apparent that through the configuration of the retaining mechanism 20, 20', the user can easily lock or remove the electronic component 10 to or from the casing 2. As a result, assembly and disassembly time, as well as the production costs associated therewith, can be reduced. Hence, the objects of the present invention can be realized.

While the present invention has been described in connection with what are considered the most practical and embodiments, it is understood that this invention is not limited to the disclosed embodiments but is intended to cover various arrangements included within the spirit and scope of the broadest interpretations and equivalent arrangements.

We claim:

1. A retaining mechanism for retaining an electronic component in a casing, the electronic component including a support bracket having an end part formed with an engaging hole, the casing including a bottom wall, and two spaced-apart guide elements projecting from the bottom wall to define therebetween a receiving space for receiving the electronic component, said retaining mechanism comprising:
   a mounting block adapted to project from an inner surface of the bottom wall, and having a mounting hole for receiving the end part of the support bracket when the electronic component is guided by the guide elements to move into the receiving space, and a through hole that communicates with said mounting hole and that is adapted to align with the engaging hole;
   a seat body seated on and covering said mounting block, and having a bolt hole communicating with and disposed above said through hole, and a limiting slot communicating with one side of said bolt hole; and
   a locking bolt including a shank disposed slidably in said bolt hole and having a top portion extending through a top surface of said seat body, and a bottom portion extending into said through hole, said locking bolt further including a stopper block connected transversely to said bottom portion and abutting against said mounting block, said stopper block being extendable into said limiting slot and being slidable upward and downward along said limiting slot, said bottom portion of said shank being adapted to engage releasably the engaging hole when said through hole is aligned with the engaging hole.

2. The retaining mechanism of claim 1, wherein said mounting block includes a top plate having said through hole and spaced apart from said bottom wall, said stopper block abutting against said top plate, said mounting hole being disposed below said top plate and having a side opening adapted to communicate with the receiving space for entry of the end part of the support bracket into said mounting hole, said bottom portion of said shank being adapted to be exposed on a bottom opening of the bottom wall when the end part of the support bracket enters said mounting hole and said bottom portion of said shank engages the engaging hole.

3. The retaining mechanism of claim 2, wherein said bottom portion of said shank has a shank slanting face facing said side opening, said shank slanting face being adapted to be pushed upward by a plate slanting face of the end part of the support bracket when the end part of the support bracket enters said mounting hole through said side opening, said top plate being formed with a recess communicating with said through hole and receiving said stopper block.

4. The retaining mechanism of claim 3, wherein said recess has a polygonal shape, and said stopper block has a shape corresponding to that of said recess.

5. The retaining mechanism of claim 4, further comprising a biasing spring sleeved on said shank and having two opposite ends abutting respectively against said stopper block and said seat body, said biasing spring biasing said stopper block to move toward said recess.

6. The retaining mechanism of claim 5, wherein said seat body has two said limiting slots disposed on and communicating respectively with two opposite sides of said bolt hole, said top plate being formed with two said recesses communicating respectively with two opposite sides of said through hole, said locking bolt including two said stopper blocks respectively received in said recesses, each of said stopper blocks extending into a respective one of said limiting slots, said two ends of said biasing spring abutting respectively against said stopper blocks and said seat body.

7. The retaining mechanism device of claim 3, wherein said recess has a sector-shaped, said seat body abutting against said top plate, said limiting slot communicating with a portion of said recess, said locking bolt being rotatable about an axis of said shank to move said stopper block between a first position, where said stopper block is aligned with the limiting slot, and a second position, where said stopper block is out of alignment with said limiting slot and abuts against said seat body.

8. The retaining mechanism of claim 7, wherein said sector-shaped recess is bounded by first and second stop edges that are angularly spaced apart from each other, said stopper block contacting said first stop edge when in said first position and contacting said second stop edge when in said second position.

9. The retaining mechanism of claim 8, wherein said top plate is further formed with a positioning groove communicating with said recess, said stopper block being provided with a projection to engage releasably said positioning groove, said projection engaging said positioning groove when said stopper block is in said second position.

10. An electronic device, comprising:
    an electronic component including a support bracket having an end part formed with an engaging hole;
    a casing including a bottom wall, and two spaced-apart guide elements projecting from said bottom wall to define therebetween a receiving space above said bottom wall, said receiving space receiving said electronic component, said guide elements capable of guiding said electronic component to move into or out of said receiving space; and
    a retaining mechanism including
        a mounting block projecting from an inner surface of said bottom wall, and having a mounting hole to receive said end part of said support bracket when said electronic component is moved into said receiving space, and a through hole that communicates with said mounting hole and that is alignable with said engaging hole;
        a seat body seated on and covering said mounting block, and having a bolt hole communicating with and disposed above said through hole, and a limiting slot communicating with one side of said bolt hole; and
        a locking bolt including a shank disposed slidably in said bolt hole and having a top portion extending through a top surface of said seat body, and a bottom portion extending into said through hole, said locking bolt further including a stopper block connected transversely to said bottom portion and abutting against said mounting block, said stopper block being extendable into said limiting slot and being slidable upward and downward along said limiting slot, said bottom portion of said shank being engaged releasably with said engaging hole when said through hole is aligned with said engaging hole.

11. The electronic device of claim 10, wherein said mounting block includes a top plate having said through hole and spaced apart from said bottom wall, said stopper block abutting against said top plate, said mounting hole being disposed below said top plate and having a side opening communicating with said receiving space to permit entry of said end part of said support bracket into said mounting hole, said bottom wall having a bottom opening proximate to said receiving space, said bottom opening exposing said end part of said support bracket and said bottom portion of said shank when said end part of said support bracket enters said mounting hole and said bottom portion of said shank engages said engaging hole.

12. The electronic device of claim 11, wherein said bottom portion of said shank has a shank slanting face facing said side opening, said end part of said support bracket having a plate slanting face to push upward said shank slanting face when said end part of said support bracket enters said mounting hole through said side opening, said top plate being formed with a recess communicating with said through hole and receiving said stopper block.

13. The electronic device of claim 12, wherein said support bracket further has a tool-receiving groove communicating with said engaging hole and opposite to said plate slanting face.

14. The electronic device of claim 12, wherein said recess has a polygonal shape, and said stopper block has a shape corresponding to that of said recess.

15. The electronic device of claim 14, wherein said retaining mechanism further includes a biasing spring sleeved on said shank and having two opposite ends abutting respectively against said stopper block and said seat body, said biasing spring biasing said stopper block to move toward said recess.

16. The electronic device of claim 15, wherein said seat body has two said limiting slots disposed on and communicating respectively with two opposite sides of said bolt hole, said top plate being formed with two said recesses communicating respectively with two opposite sides of said through hole, said locking bolt including two said stopper blocks respectively received in said recesses, each of said stopper blocks extending into a respective one of said limiting slots, said two ends of said biasing spring abutting respectively against said stopper blocks and said seat body.

17. The electronic device of claim 12, wherein said recess has a sector-shaped, said seat body abutting against said top plate, said limiting slot communicating with a portion of said recess, said locking bolt being rotatable about an axis of said shank to move said stopper block between a first position, where said stopper block is aligned with the limiting slot, and a second position, where said stopper block is out of alignment with said limiting slot and abuts against said seat body.

18. The electronic device of claim 17, wherein said sector-shaped recess is bounded by first and second stop edges that are angularly spaced apart from each other, said stopper block contacting said first stop edge when in said first position and contacting said second stop edge when in said second position.

19. The electronic device of claim 18, wherein said top plate is further formed with a positioning groove communicating with said recess, said stopper block being provided with a projection to engage releasably said positioning groove, said projection engaging said positioning groove when said stopper block is in said second position.

* * * * *